United States Patent
Miller et al.

(10) Patent No.: US 6,176,536 B1
(45) Date of Patent: Jan. 23, 2001

(54) VEHICLE SOFT CONSOLE WITH INTERCHANGEABLE ACCESSORY BINS AND IN-MOLDED SKIN AND FASTENER

(75) Inventors: Dean T. Miller, Wyoming; Douglas A. Fischer, Grand Rapids; Douglas C. Miller, Hersey; Mark R. Litke, Holland, all of MI (US)

(73) Assignee: Lear Donnelly Overhead Systems L.L.C., Southfield, MI (US)

( * ) Notice: Under 35 U.S.C. 154(b), the term of this patent shall be extended for 0 days.

(21) Appl. No.: 09/115,314

(22) Filed: Jul. 14, 1998

Related U.S. Application Data

(60) Provisional application No. 60/052,454, filed on Jul. 14, 1997.

(51) Int. Cl.⁷ .................................................... B60N 3/12
(52) U.S. Cl. ........................ 296/37.7; 296/37.8; 224/311
(58) Field of Search ................................ 296/37.1, 37.7, 296/37.8; 224/311

(56) References Cited

U.S. PATENT DOCUMENTS

| | | |
|---|---|---|
| 4,100,372 * | 7/1978 | Hypolite . |
| 4,293,161 | 10/1981 | Lutz . |
| 4,432,580 * | 2/1984 | Lohmar et al. ...................... 296/39.3 |
| 4,441,641 | 4/1984 | Thompson . |
| 4,478,660 | 10/1984 | Landler et al. . |
| 4,562,032 | 12/1985 | Gaudreau . |
| 4,783,110 | 11/1988 | Beukema et al. . |
| 4,844,533 * | 7/1989 | Dowd et al. ...................... 296/37.7 X |
| 4,867,498 * | 9/1989 | Delphia et al. ...................... 296/37.7 |
| 4,891,081 | 1/1990 | Takahashi et al. . |
| 4,892,770 | 1/1990 | Labrie . |
| 4,893,867 | 1/1990 | Hilborn et al. . |
| 5,020,845 | 6/1991 | Falcoff et al. . |
| 5,050,922 | 9/1991 | Falcoff . |
| 5,056,199 | 10/1991 | Stein et al. . |
| 5,062,559 | 11/1991 | Falcoff . |
| 5,064,974 * | 11/1991 | Vigneau et al. ................. 296/37.7 X |
| 5,286,431 | 2/1994 | Banfield et al. . |
| 5,388,880 * | 2/1995 | Kinane ................................ 296/37.7 |
| 5,418,257 * | 5/1995 | Weisman . |
| 5,474,841 | 12/1995 | Matsuki et al. . |
| 5,494,542 | 2/1996 | Muller . |
| 5,713,623 * | 2/1998 | Mattingly ............................ 296/37.7 |
| 5,775,762 * | 7/1998 | Vitito .................................... 296/37.7 |

* cited by examiner

Primary Examiner—D. Glenn Dayoan
Assistant Examiner—Jason Morrow
(74) Attorney, Agent, or Firm—Brooks & Kushman P.C.

(57) ABSTRACT

A console and method of installing a console for a motor vehicle or the like including a passenger cabin. The console includes an accessory module for use by occupants of the vehicle and has a housing with fasteners adapted to mount the console within the vehicle cabin. A chamber having an open side is formed in the console and receives an accessory module. At least a portion of the housing comprises an expanded polymeric material, preferably expended polypropylene, to provide a soft surface within the vehicle cabin. A decorative skin covers a surface of the housing that confronts the vehicle cabin in another embodiment

24 Claims, 4 Drawing Sheets

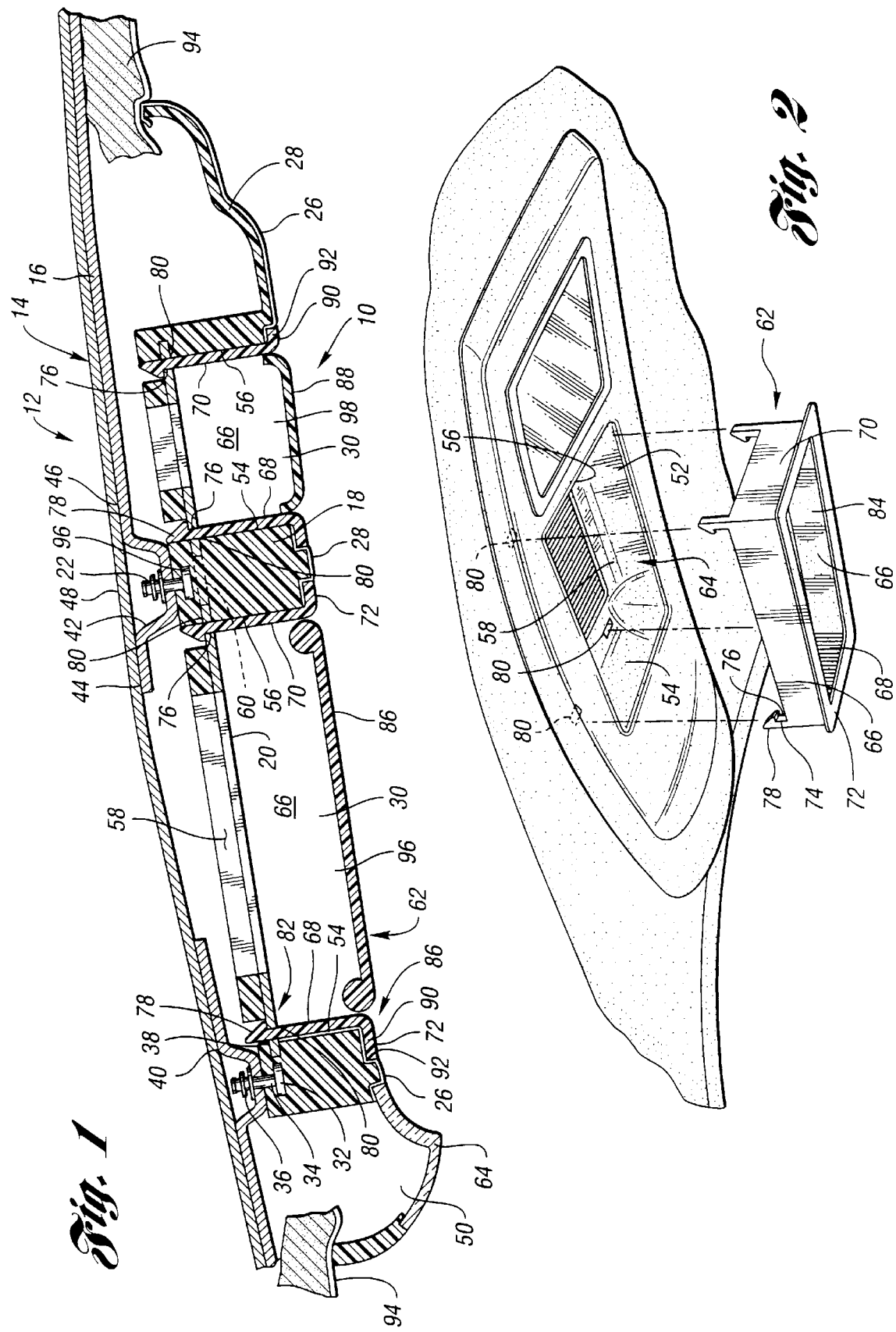

VEHICLE SOFT CONSOLE WITH INTERCHANGEABLE ACCESSORY BINS AND IN-MOLDED SKIN AND FASTENER

STATEMENT OF PRIORITY

This application claims the benefit of U.S. Provisional Application Ser. No. 60/052,454, filed on Jul. 14, 1997.

BACKGROUND OF THE INVENTION

1. Field of the Invention

This invention relates to a vehicle console and, more particularly, to a motor vehicle console made from soft molded material with an in-molded support structure, decorative outer skin, and fasteners. In another aspect, the invention relates to a vehicle console formed of a soft material and having interchangeable accessory modules. In yet another aspect, the invention relates to a method for installing such consoles in a vehicle.

2. Description of the Related Art

Overhead consoles have increasingly become a standard feature in automobiles and other motor vehicles. These consoles contain a variety of vehicle accessories such as reading lamps, courtesy lamps, storage compartments, and various electronic gadgetry such as compasses, temperature displays, and clocks. The consoles are typically molded from a relatively hard, structural plastic which during a crash undesirably can become a hard, unyielding impact surface for a portion of an occupant's body, especially the head. It is desirable to reduce the hardness of the console without sacrificing the required structural integrity provided by the current consoles.

It is desirable to increase the productivity and efficiency with which these consoles are manufactured and installed into roof structures. Hence, pre-assembled consoles have become increasingly popular. However, these assemblies have utilized various fastening methods to attach the console to the roof structure. For example, the utilization of conventional fasteners such as bolts or multiple fastening screws for attaching overhead consoles to the vehicle within the vehicle interior slow the speed of the installation processes. Also, with many upholstered consoles, the utilization of fastening devices such as screws that are rapidly inserted and tightened sometimes damages the upholstery when the fastening tool slips from the fastener. Using "Christmas tree"-type fasteners that are inserted and retained at their anchoring end in holes formed in the substrate has facilitated console installation over the prior fastening techniques. However, further reduction of manufacturing speed could be attained if the fasteners were integrally joined with the substrate in the molding process rather than later attached thereto.

In addition, the application of decorative fabric or vinyl skin to the console is performed in a separate step after the console is molded. This extra step adds to the manufacturing time.

SUMMARY OF THE INVENTION

According to the invention, a console for a motor vehicle or the like having a passenger cabin includes an accessory module for use by occupants of the vehicle as well as a housing having fasteners adapted to mount the console within the vehicle cabin and walls forming at least one chamber having an open side. At least one accessory module is mounted within the chamber for use by occupants of the vehicle and is further accessible through the open side. A portion of the housing comprises an expanded polymeric material to provide a soft surface within the vehicle cabin. In a preferred embodiment, the entire housing is molded from the expanded polymeric material; most preferably, the expanded polymeric material is polypropylene.

Preferably, the console is an overhead console. Alternatively, the vehicle can include seats spaced laterally from one another and the console is mounted between the seats. The fasteners are preferably in-molded to the housing. A decorative skin covers a surface of the housing that confronts the vehicle cabin. Preferably, the decorative skin is in-molded to the housing.

The housing can further include a support frame of structural material and the accessory module is mounted to the support frame. Preferably, the support frame is in-molded to the housing.

The housing can have two or more chambers, each of the chambers having at least one accessory module mounted therein. The accessory module can include several different accessory modules of a common foot print, each of the different accessory modules being interchangeably mounted within the at least one chamber of the housing. The accessory modules are preferably selected from a group including reading lamps, courtesy lamps, storage compartments, compasses, temperature displays, and clocks. Preferably, the support frame has slots and each accessory module has resilient fasteners that snap-fit into the slots.

Another embodiment includes a housing having at least one retainer of structural material, wherein the accessory module is mounted to the retainer. Preferably the at least one retainer is mounted in the chamber. Alternatively, the at least one retainer is two or more retainers mounted in the chamber, and each retainer mounts at least one accessory module. Or, the retainer is in-molded in the expanded polymeric material. In either form of mounting, one variation includes the at least one accessory module being several different accessory modules of a common footprint, each of the different accessory modules being interchangeably mounted within the at least one retainer of the housing. Another variation is the at least one retainer being two or more retainers mounted in the chamber, and each retainer mounts at least one accessory module.

Further according to the invention, a method for installing a console in a motor vehicle or the like including a passenger cabin, wherein the console includes accessory modules for use by occupants of the vehicle, includes steps of molding a housing of an expanded polymeric material to provide a soft surface within the passenger cabin; forming walls defining at least one chamber in the housing, wherein the chamber includes an open side; mounting at least one accessory module within the at least one chamber and through the open side; and fastening the console to the vehicle within the passenger cabin. Preferably, the housing is molded from expanded polymeric material, such as polypropylene. Preferably, the vehicle includes a headliner and the fastening step includes fastening the console to the headliner. Alternatively, the vehicle can include seats spaced laterally from one another and the fastening step includes fastening the console between the seats.

The molding step can further include the in-molding of a decorative skin to a surface of the housing that confronts the vehicle cabin. The housing preferably includes fasteners for fastening the console to the vehicle and the molding step further includes in-molding the fasteners to the housing. The housing can also include a support frame of structural material and the mounting step includes mounting the accessory module to the support frame. Preferably, the molding step further includes in-molding the support frame in the housing.

In another step, the support frame has slots, the accessory module has resilient fasteners, and the mounting step further includes snap-fitting the resilient fasteners into the slots. The accessory module can include several different accessory modules of a common foot print, and the mounting step further includes interchangeably mounting each of the different accessory modules within the at least one chamber of the housing.

These and other features, advantages, and objects of the invention will be apparent from the ensuing description taken in conjunction with the accompanying drawings.

BRIEF DESCRIPTION OF THE DRAWINGS

The invention will now be described with reference to the drawings in which:

FIG. 1 is a side-elevational, cross-sectional view of an overhead console assembly according to the invention mounted to the roof structure of a vehicle showing two accessory chambers with support frames;

FIG. 2 is a bottom partially exploded perspective view of the overhead console assembly, headliner, support frame and accessory bin;

DETAILED DESCRIPTION OF THE PREFERRED EMBODIMENTS

Figure 3:
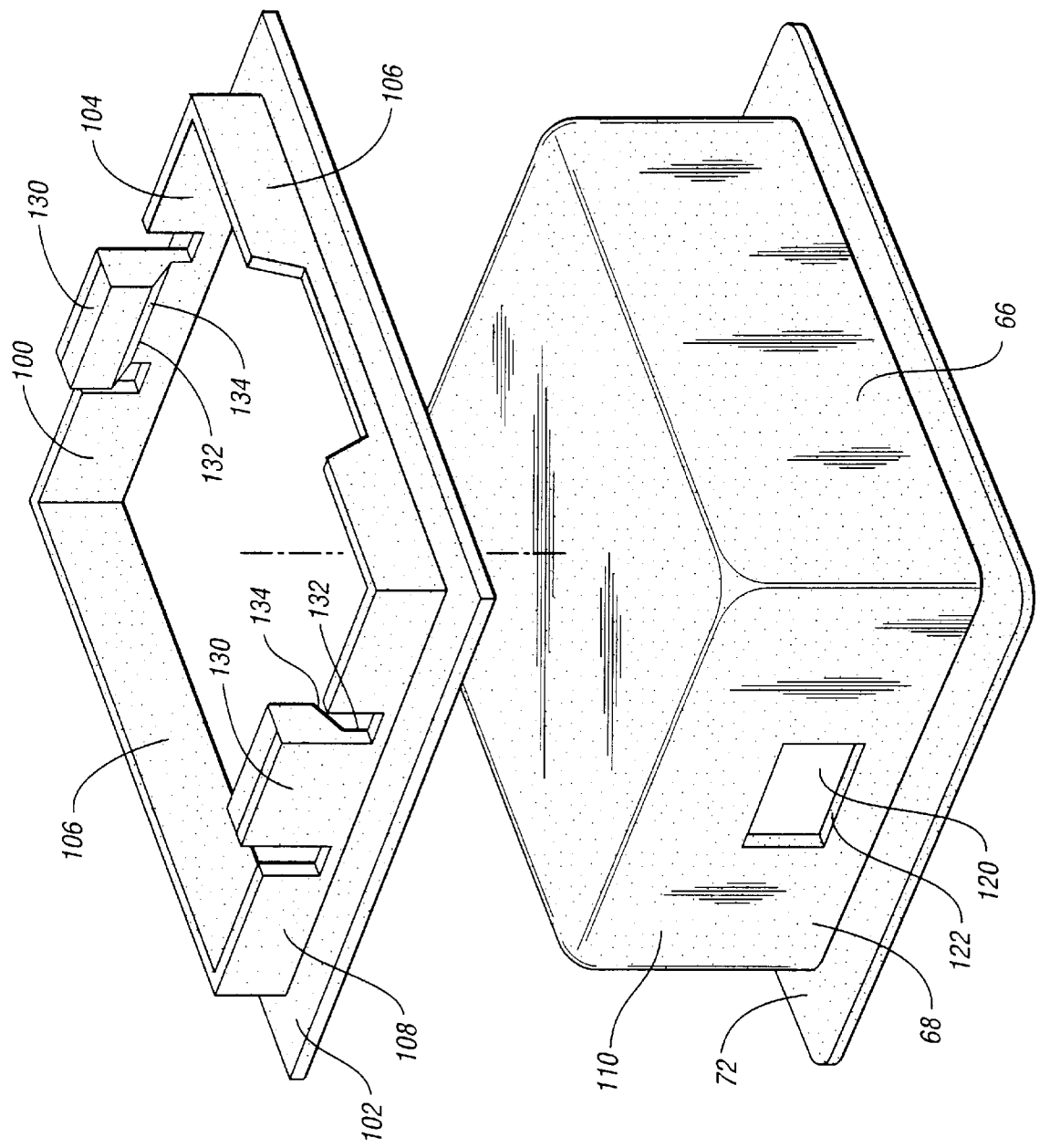
FIG. 3 is a partial perspective view of a second embodiment according to the invention and illustrating a separate accessory bin and bin retainer mounting the accessory bin to the console.

Referring now to FIGS. 1 and 2, the overhead console assembly 10 is shown with various electrical and other mechanical components not illustrated so that the mounting structure can be more clearly shown. In FIG. 1, the overhead console assembly 10 according to the invention is shown attached to the roof structure 12 of a vehicle that includes the exterior vehicle roof panel 14 and mounting bracket 16. The overhead console assembly 10, which is generally concave to conform to the slope of the roof structure 12, comprises an inmolded support frame 20, fasteners 22, a decorative covering or skin 26, and accessory chambers 30 all integrally molded with a console body 18.

As shown in FIG. 1, the fasteners 22 are "Christmas tree"-type or similar fasteners. Preferably, while not shown, the fastener is the mounting clip described in U.S. Pat. No. 5,662,375 to Adams et al.

The console body 18 is a molded article constructed by either blending a pressure sensitive blowing agent with a thermoplastic polymer, such as polypropylene, and injecting the mixture into a mold cavity under heat and pressure, or by injecting pressurized expanded polyolefin particles (EPP) into the mold and expanding the EPP in the mold under heat and pressure. The injected mixture expands to fill the mold cavity and adheres to the skin 26 of decorative material, such as fabric or vinyl, that is predisposed in the mold cavity in a manner so as to cover the lower surface 28 of the console body 18. The expanded polypropylene surrounds the support frame 20, which contains the receptors for the fasteners 22. Accessory chambers 30 of various shapes and sizes can be molded into the console body 18 as desired. Alternatively, the console assembly 10 according to the invention can be formed from expanded polypropylene beads that are charged into a mold cavity and heated to expand and fuse together. These molding techniques are well known in the molding art.

Each fastener 22 is preferably made of rigid plastic and generally comprises a circular base portion 32 at the anchoring end 24, a cylindrical trunk 34, and a series of directional teeth or conical barbs 36 integrally formed on the cylindrical trunk 34. Each fastener 22 is incorporated in the console body 18 during the molding process such that the base portion 32 and part of the cylindrical trunk 34 are embedded within the console body 18 and the barbs 36 are above an upper surface 38 of the console body 18. The portion of each fastener 22 not embedded in the console body 18 is pushed through a corresponding hole 40 in the U-shaped portion 42 of the mounting bracket 16 to mount the console body 18 to the roof structure 12. The mounting brackets 16 have a straight portion 44 in addition to the U-shaped portion 42. The upper surface 46 of the straight portion 44 of mounting bracket 16 is mounted to the lower surface 48 of the roof panel 14. The roof mounting brackets can be cantilevered or X-beams as well. FIG. 1 shows two fasteners 22 and two mounting brackets; however, the invention is not so limited and may include as many mounting brackets and fasteners of different types as desired to securely mount the overhead console assembly 10 to the roof structure 12.

Once mounted, the overhead console assembly 10 abuts the headliner 94 in a manner such that the skin 26 at the lower surface 28 of the console body 18 meets the headliner 94 in a substantially streamlined fashion with negligible gaps. The fasteners 22 can be two-piece fasteners of the type that are currently use in conventional door panels. When the console assembly 10 is serviced, for example when the bins are removed for service, one part of the fastener 22 can be removed with the bin and another part remains with the frame 20. Alternatively, an integral fastener can be employed and the entire fastener can be removed upon servicing the console bins.

Accessory chambers 30 are formed during the molding process to conform in size and shape to the desired accessories modules to be disposed therein. Each accessory chamber 30 has an opening adapted to receive accessory modules. Preferably, the accessory modules have a common footprint, whereby they can be interchangeably mounted in the same accessory chamber 30. For example, a trip computer chamber 50 with a trip computer lens 64 disposed therein is located in the forward portion of the console assembly; a snap-in storage bin 96 with a door 86 is located in the middle portion of the console assembly; and a snap-in map lamp chamber 98 with a lens 88 is shown in the rear portion of the console assembly 10. Each or all of those aforementioned accessory modules are preferably interchangeably replaceable with a variety of vehicle accessories such as reading lamps, courtesy lamps, storage compartments, and various electronic vehicle gadgetry such as compasses, temperature displays, and clocks. Each accessory chamber 30 generally includes a pair of generally parallel sidewalls 52 connecting a forward wall 54 to a rear wall 56. An upper wall 58 closes the chamber 30 at an upper end thereof, and an opening is located at the lower surface 28 of the console body 18.

A support frame 20 preferably made of metal or rigid plastic is embedded into the console body 18 during the molding process to mount the accessories mounted within the chambers 30 through a snap fit attachment. The support frame 20 abuts the upper wall 58 of the accessory chamber 30 and is embedded in the console body 18 traversing the sidewalls 52, forward walls 54, and rear walls 56 of all accessory chambers 30. If desirable for injection molding purposes, apertures 60 are formed within the support frame 20 for the passage of injected polymer. Alternatively, individual support frame modules for each accessory chamber 30 can be used, in which case each support frame would likewise abut the upper wall and be embedded in the side walls 52 and forward walls 54, 58 of each accessory chamber 30, but would not require apertures 60 for injection molding. The support frames can be in the form of a plate or spaced rails.

The support frames 20 are illustrated in the upper wall 58 of the console for purposes of illustration. The support frames 20 can, however, also be in-molded into the sidewalls 52, the forward walls 54 and/or rear walls 56. The support frames 20 can provide sockets for snap fit attachment of various accessory bins.

With particular reference now to FIG. 2, an accessory bin 62 is installed through the opening and into the accessory chamber 30. The accessory bin 62, which is molded from polypropylene or an equivalent moldable material such as any of the various known plastics, serves as a closure to the opening of the accessory chamber 30 and as a customized housing for a modular vehicle accessory component (not shown). Generally, the support frame includes a pair of sidewalls 66 connecting a forward wall 68 to a rear wall 70, and a decorative bezel 72 at one end, and a plurality of integral resilient fasteners 74 at the other end. The resilient fasteners 74 extend upwardly and outwardly from the accessory bin 62, preferably at the four corners formed by the conjunction of the walls 66, 68, 70. The resilient fasteners 74 are received within mating slots 80, which are formed in the support frame 20 and molded in the console body 18. The mating slots 80 pass from the interior of the accessory chamber 30 and extend through the support frame 20 and the upper surface 38 of the console body 18. Each resilient fastener 74 has an inner surface 76 that forms an undercut shoulder 78. The inner surfaces 76 of the resilient fasteners 74 rest against the inner straight edge 82 of the support frame 20 when the accessory bin 62 is forced into the accessory chamber 30 and the undercut shoulders 78 snap over the edges of the mating slots 80.

Once snapped into the mating slots 80, the resilient fasteners 74s are resistant to separation and thereby keep the accessory bin 62 securely within the accessory chamber 30. The resilient fasteners 74 can be removed from the mating slots 80 through access slots (not shown) in the ceiling of insert 62 by relieving the resilient fasteners 74 from engagement with the slots 80. When the accessory bin 62 is snapped into the chamber 30, the forward wall 68 of the accessory bin 62 abuts the forward wall 54 of the accessory chamber 30; the rear wall 70 of the accessory bin 62 abuts the rear wall 56; and the side walls 66 of the accessory bin 62 abut the side walls 52 of the accessory chamber 30.

The decorative bezel 72 of the accessory bin 62 substantially conforms to the curvature of the lower surface 28 of the console body 18 and includes an aperture 84 in register with the opening of the accessory chamber 30. The decorative bezel 72 is slightly larger than the opening in which the accessory bin 62 fits. As shown in FIG. 1, the bezel 72 fits into a recess 90 molded into the lower surface 28 of the console body 18 such that the bezel outer surface 92 is flush with the skin 26 at the lower surface 28. The bezel 72 frames the aperture 84 and the door 86, the lens 88 or any component control switches (not shown) disposed therein.

With particular reference now to FIG. 3, an alternative embodiment is illustrated. A bin retainer 100 releasably mounts an accessory bin 110 through the opening and into the accessory chamber 30. The bin retainer 100 is mounted within the accessory chamber, and then interchangeably mounts a variety of accessory modules in accessory bins 62. Generally, the bin retainer 100, includes a pair of side walls 106 connecting a forward wall 108 to a rear wall 104, and a surrounding ledge 102 at one end. The accessory bin 110, which is molded from polypropylene or an equivalent moldable material such as any of the various known plastics, mounts to the retainer 100 and serves as a closure to the opening of the accessory chamber 30 and as a customized housing for a modular vehicle accessory component (not shown).

Generally, the accessory bin 110, like the accessory bin 62, includes a pair of side walls 66 connecting a forward wall 68 to a rear wall 70, and a decorative bezel 72 at one end. The description of the accessory bin 62 is hereby incorporated to describe the accessory bin 110, with a couple notable distinctions. First, the accessory bin 110 includes snap receptacles 120 in at least two of the walls 66, 68, 70. The receptacles 112 are shown in walls 68, 70. Second, the accessory bin 110 does not include resilient fasteners 74.

In a first embodiment, the bin retainer 100 includes a plurality of integral resilient fasteners 74 on its bottom wall, as illustrated in FIG. 2 for the accessory bin 62. This embodiment is not illustrated in the figures, but is simply the description of the resilient fasteners 74 for the accessory bin 62 applied to the retainer 100. Thus, the resilient fasteners 74 extend upwardly and outwardly from the retainer 100, preferably at the four corners formed by the conjunction of the walls 104, 106, 108. Just as for the resilient fasteners 74 depending from the accessory bin 62, the resilient fasteners 74 depending from the retainer 100 are received within mating slots 80, which are formed in the support frame 20 and molded in the console body 18. The above description of the operation of the resilient fasteners 74 for the accessory bin 62 is incorporated herein for the operation of the resilient fasteners 74 for the bin retainer 100.

Figure 6:
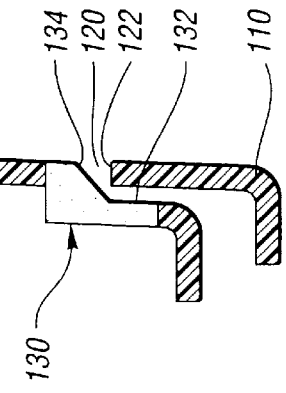
FIG. 6 is a sectional view illustrating the snap-fit connection between the bin retainer and the accessory bin.

The bin retainer 100 further includes bin snaps 130, preferably formed integral with the opposed walls 104, 108. Each bin snap 130 has an inner surface 132 that forms an undercut shoulder 134. The inner surfaces 132 rest against an inner straight edge 122 of the snap receptacles 120 when the accessory bin 110 is forced into the bin retainer 100 and the undercut shoulders 134 snap over the edges 122 of the snap receptacles 120. The reception of the snap retainers 130 in the snap receptacles is best shown in FIG. 6. Once snapped into the snap receptacles 120, the bin snaps 130 are resistant to separation and thereby keep the accessory bin 110 securely within bin retainer 100, and within the accessory chamber 30. The bin snaps 130 can be removed from the snap receptacles 120 through access slots (not shown) in the ceiling of bin 110 by relieving the bin snaps 130 from engagement with the snap receptacles 120.

When the accessory bin 110 is snapped into the bin retainer 100, which is releasably mounted in the accessory chamber 30, the forward wall 68 of the accessory bin 110 abuts the forward wall 54 of the accessory chamber 30; the rear wall 70 of the accessory bin 110 abuts the rear wall 56; and the side walls 66 of the accessory bin 110 abut the side walls 52 of the accessory chamber 30. The decorative bezel 72 of the accessory bin 110 substantially conforms to the curvature of the lower surface 28 of the console body 18 and includes an aperture 84 in register with the opening of the accessory chamber 30. The decorative bezel 72 is slightly larger than the opening in which the accessory bin 110 fits. As shown in FIG. 1, the bezel 72 fits into a recess 90 molded into the lower surface 28 of the console body 18 such that the bezel outer surface 92 is flush with the skin 26 at the lower surface 28. The bezel 72 frames the aperture 84 and the door 86, the lens 88 or any component control switches (not shown) disposed therein.

In an alternative embodiment (not shown), a bin retainer is formed integral with the console body 18. Preferably, the bin retainer is in-molded to the side walls 52, the forward walls 54 and/or rear walls 56 of the console body 18. Structurally, the bin retainer according to this embodiment is similar to the bin retainer 100, except that it does not include the resilient fasteners 74. Then, as before, the retainer 100 releasably mounts accessory bin 110 through the opening and into the accessory chamber 30 and interchangeably mounts a variety of accessory modules in accessory bins 62.

In a further embodiment (not shown), a bin retainer is fastened to the headliner or other structure of a motor vehicle, as opposed to the console body 18, whereby the bin retainer is independently mounted. In one form, this embodiment is essentially the bin retainer 100 wherein the resilient fasteners mount the bin retainer to the vehicle as opposed to the console body 18. In another form, the bin retainer includes a different fastening system, such as conventional "Christmas tree"-type fasteners or, preferably, mounting clips as described in U.S. Pat. No. 5,662,375 to Adams et al.

Figure 4:
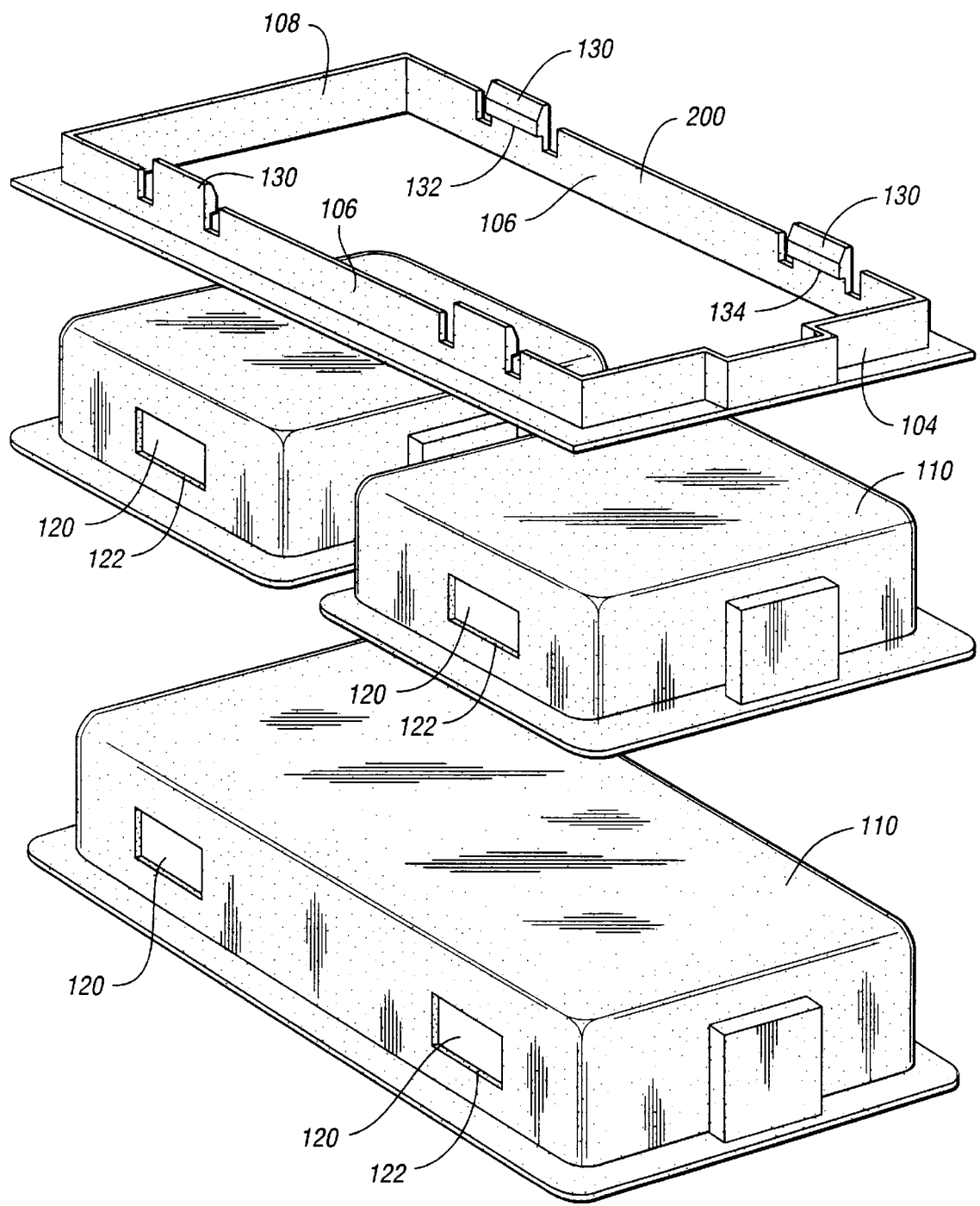
FIG. 4 is a third embodiment according to the invention illustrating multiple accessory bins in combination with a bin retainer mounting multiple accessory bins to the console.

In yet another embodiment, as best illustrated in FIG. 4, a bin retainer 200 mounts one or more accessory bins 110 of differing sizes. Thus, not only are the accessory bins 110 interchangeably mounted to provide greater flexibility in component choice, this embodiment includes a bin retainer 200 adapted to mount one, two, or more accessory bins 110, whereby greater flexibility in mounting order, component size, and consumer preference is provided. The bin retainer 200, as shown, includes two sets of bin snaps 130, preferably formed integral with the opposed side walls 106. Of course, three or more sets of bin snaps 130 can be formed in the walls 104, 106, 108 of the retainer 200. As described above, each bin snap 130 has an inner surface 132 that forms an undercut shoulder 134. The inner surfaces 132 rest against an inner straight edge 122 of the snap receptacles 120 when the accessory bins 110 are forced into the bin retainer 200 and the undercut shoulders 134 snap over the edges 122 of the snap receptacles 120. The reception of the snap retainers 130 in the snap receptacles is best shown in FIG. 6. Once snapped into the snap receptacles 120, the bin snaps 130 are resistant to separation and thereby keep the accessory bins 110 securely within bin retainer 200, and within the accessory chamber 30. The bin snaps 130 can be removed from the snap receptacles 120 through access slots (not shown) in the ceiling of bin 110 by relieving the bin snaps 130 from engagement with the snap receptacles 120.

This latter embodiment can be further varied by the aforementioned bin retainer embodiments wherein: (1) the bin retainer is formed integral with the console body 18; and (2) the bin retainer is fastened to the headliner or other structure of a motor vehicle, as opposed to the console body 18. If formed integral, the bin retainer 200 is preferably in-molded to the side walls 52, the forward walls 54 and/or rear walls 56 of the console body 18. If mounted independently of the console body 18, the bin retainer 200 preferably includes a conventional fastening system to mount the bin retainer 200 to the vehicle, as discussed briefly above.

Figure 5:
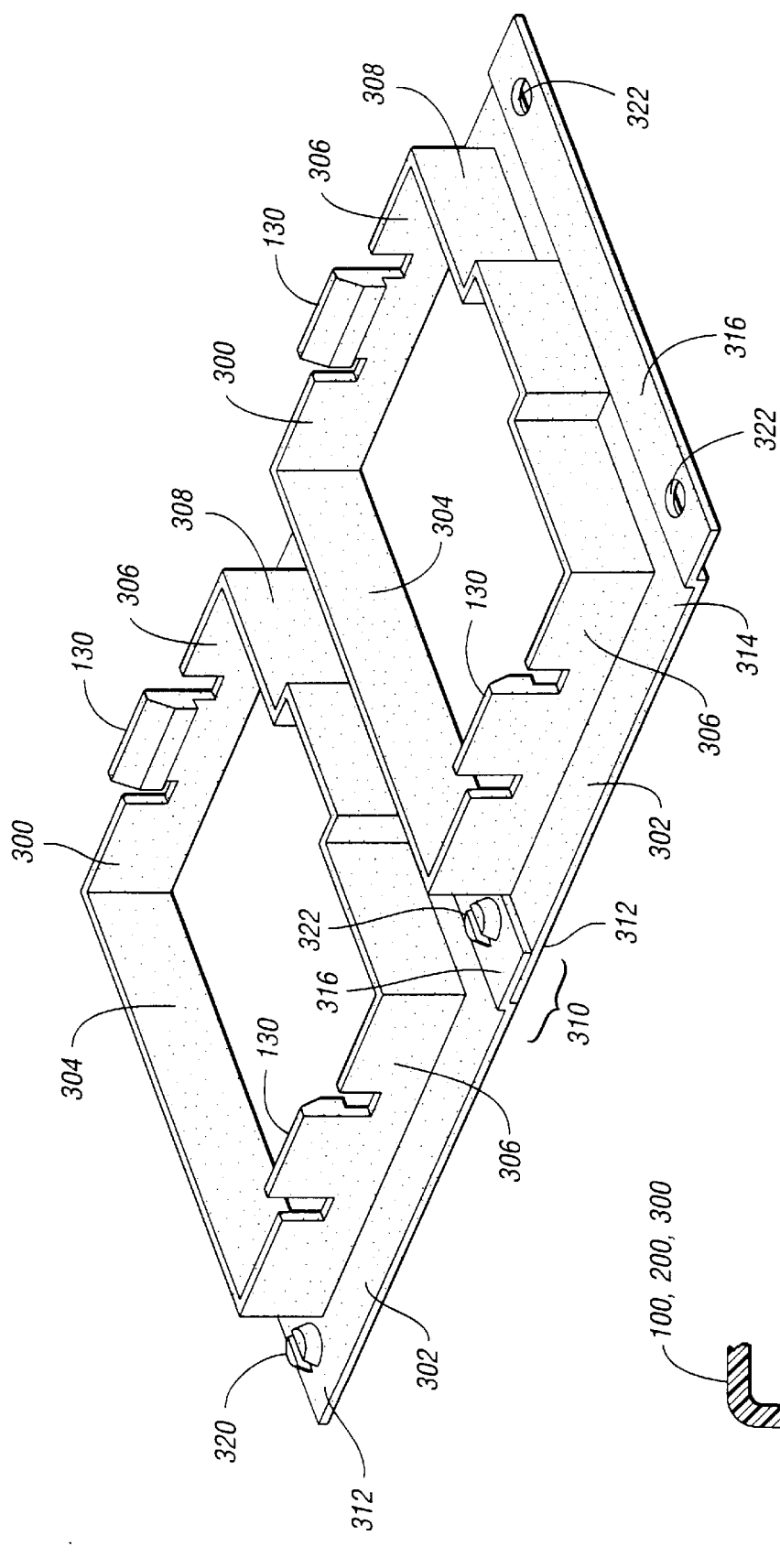
FIG. 5 is a fourth embodiment according to the invention and illustrating multiple bin retainers for mounting accessory bins to the console.

Another embodiment is illustrated in FIG. 5, which includes bin retainers 300 fastened to one another. In this embodiment, the accessory chamber 30 includes an opening adapted to receive multiple bin retainers 300. The bin retainer 100 is mounted within the accessory chamber 30, and then interchangeably mounts, in differing combinations, a variety of accessory modules in accessory bins 300. The bin retainers 300, which are structurally similar to the bin retainers 100, generally include a pair of side walls 306 connecting a forward wall 308 to a rear wall 304, and a surrounding ledge 302 at one end. In distinction to the prior embodiments, mated edges of the ledge 302 form a lap joint 310. On one side of the bin retainer 300, an edge 312 of the ledge 302 is generally planar and includes a pair of upstanding snap retainers 320 disposed at opposite corners of the edge 312. The opposite edge 314 of the ledge 302 includes a depending flange 316 extending from the edge 314 in a plane parallel to the ledge 302. The flange 316 includes a pair of apertures 322 disposed at opposite corners adjacent the edge 314. Adjacent bin retainers 300 are joined to one another by overlaying the flange 316 of edge 314 on the edge 312 and axially aligning the snap retainers 320 and the apertures 322. The flange 316 is urged downwardly to meet the edge 312 and force the aperture 322 over the snap retainer 320, whereby the snap retainer 320 will secure the adjacent bin retainers 300 to one another. The bins 300 can be released from one another by squeezing the halves of the bisected head of the snap retainer 320 toward one another and removing it from the aperture 322.

This latter embodiment can be further varied by the aforementioned bin retainer embodiments wherein: (1) one of the bin retainers is formed integral with the console body 18 and another, or several others, are removably fastened to the retainer formed integral with the console body; (2) the bin retainers are fastened to the headliner or other structure of a motor vehicle, as opposed to the console body 18; and (3) each bin retainer mounts one or more accessory bins of differing sizes. If formed integral, one bin retainer 300 is preferably in-molded to the side walls 52, the forward walls 54 and/or rear walls 56 of the console body 18. If mounted independently of the console body 18, the bin retainers 300 preferably include a conventional fastening system to mount the bin retainers 300 to the vehicle, as discussed briefly above. If each bin retainer 300 interchangeably mounts one or more accessory bins 110, even greater flexibility is provided in component choice because the number of bin retainers 300 themselves can be varied as well. Thus, two or more bin retainers 300 can mount one, two, or more accessory bins each, whereby even greater flexibility in mounting order, component size, and consumer preference is provided.

The resulting console assembly 10 with in-molded fasteners 22, in-molded support frame(s) 20, in-molded decorative fabric 26, in-molded bin retainers, and molded accessory chambers 30 is essentially pre-assembled and may be readily secured to the roof of the vehicle interior by simply snapping the fasteners 22 into mounting brackets 16. Various vehicle accessories can be inserted into the molded chambers 30 and securely mounted to the support frame 20. The invention thus provides flexibility in console manufacture in that a single module can be used for many different types of consoles with a wide variety of accessories. Further, the structure for fastening the bins to the retainers and the retainers to the vehicle can be varied to provide even greater flexibility in mounting order, number of components, component size, and consumer preference. Furthermore, the decorative upholstery attached to the lower surface 28 of the console body 18 by the expanded polypropylene molding process eliminates an additional step previously required for application of fabric onto the console body. These improvements eliminate the need for fastening tools, reduce injury to the surface of the console, and increase the speed of assembly and installation. In addition, the expanded polypropylene makes for a lightweight assembly with enhanced safety features, such as good head-impact qualities and energy absorption.

Whereas the invention has been described with reference to an overhead console for an automobile, the invention is equally applicable to and includes console adapted to mount between seats of an automobile.

Reasonable variation and modification are possible within the spirit of the foregoing specification and drawings without departing from the scope of the invention.

What is claimed is:

1. A console for a motor vehicle including a passenger cabin, the console comprising:
    a housing having fasteners adapted to mount the console within the passenger cabin and walls forming at least one chamber having an open side;
    at least one accessory module mounted within the at least one chamber for use by occupants of the vehicle and accessible through the open side;
    at least a portion of the housing comprises an expanded polyolefin material; and
    wherein the console further includes a support frame of structural material mounted to the housing, the accessory module is mounted to the support frame, and the support frame is in-molded in the expanded polyolefin material.

2. A console according to claim 1 wherein the console is an overhead console.

3. A console according to claim 1 wherein the vehicle includes seats spaced laterally from one another and the console is mounted between the seats.

4. A console according to claim 1 wherein there are multiple chambers, each of the chambers having one of the at least one accessory module mounted therein.

5. A console according to claim 1 wherein a decorative skin covers a surface of the housing that confronts the passenger vehicle cabin.

6. A console according to claim 5 wherein the decorative skin is in-molded to the housing.

7. A console according to claim 1 wherein the fasteners are in-molded to the housing.

8. A console according to claim 7 wherein the housing further includes a support frame of structural material and the accessory module is mounted to the support frame.

9. A console according to claim 1 wherein the expanded polyolefin material is polypropylene.

10. A console according to claim 1 wherein the at least one accessory module comprises multiple accessory modules of a common footprint, each of the multiple accessory modules being interchangeably mounted within the at least one chamber of the housing.

11. A console according to claim 1 wherein multiple accessory modules are mounted within the at least one amber of the housing.

12. A console according to claim 1 wherein the support frame has slots and the accessory module has resilient fasteners that snap-fit into the slots.

13. A console according to claim 1 wherein the housing further includes a support frame of structural material and the accessory module is mounted to the support frame.

14. A console according to claim 13 wherein the support frame has slots and the accessory module has resilient fasteners that snap-fit into the slots.

15. A console according to claim 1 wherein the at least one accessory module comprises multiple accessory modules of a common footprint, each of the multiple accessory modules being interchangeably mounted within the at least one chamber of the housing.

16. A console according to claim 15 wherein the multiple accessory modules are selected from a group including reading lamps, courtesy lamps, storage compartments, compasses, temperature displays, and clocks.

17. A console according to claim 16 wherein the console is an overhead console.

18. A console according to claim 16 wherein the vehicle includes seats spaced laterally from one another and the console is mounted therebetween.

19. A console according to claim 11 wherein said support frame comprises at least one retainer of structural material mounted to the housing and the accessory module is mounted to the retainer.

20. A console according to claim 19 wherein the at least one retainer is mounted in the chamber.

21. A console according to claim 20 wherein the at least one retainer is two or more retainers mounted in the chamber, and each retainer mounts at least one accessory module.

22. A console according to claim 19 wherein the at least one accessory module comprises multiple accessory modules of a common footprint, each of the different accessory modules being interchangeably mounted to the at least one retainer of the housing.

23. A console according to claim 22 wherein the at least one retainer is two or more retainers mounted in the chamber, and each retainer mounts at least one accessory module.

24. A console according to claim 23 wherein the multiple accessory modules are selected from a group including lamps, courtesy lamps, storage compartments, compasses, temperature displays, and clocks.

* * * * *

UNITED STATES PATENT AND TRADEMARK OFFICE
CERTIFICATE OF CORRECTION

PATENT NO. : 6,176,536 B1
DATED : January 23, 2001
INVENTOR(S) : Dean T. Miller, et al.

It is certified that error appears in the above-identified patent and that said Letters Patent is hereby corrected as shown below:

Column 10, claim 11,
Line 6, delete "amber" and insert -- chamber --.

Column 10, claim 19,
Line 31, delete "11" and insert -- 1 --.

Signed and Sealed this

Twentieth Day of November, 2001

*Attest:*

*Attesting Officer*

NICHOLAS P. GODICI
*Acting Director of the United States Patent and Trademark Office*